Feb. 25, 1930.  R. GRANT  1,748,342
VALVE ACTUATING MECHANISM
Filed Aug. 1, 1928
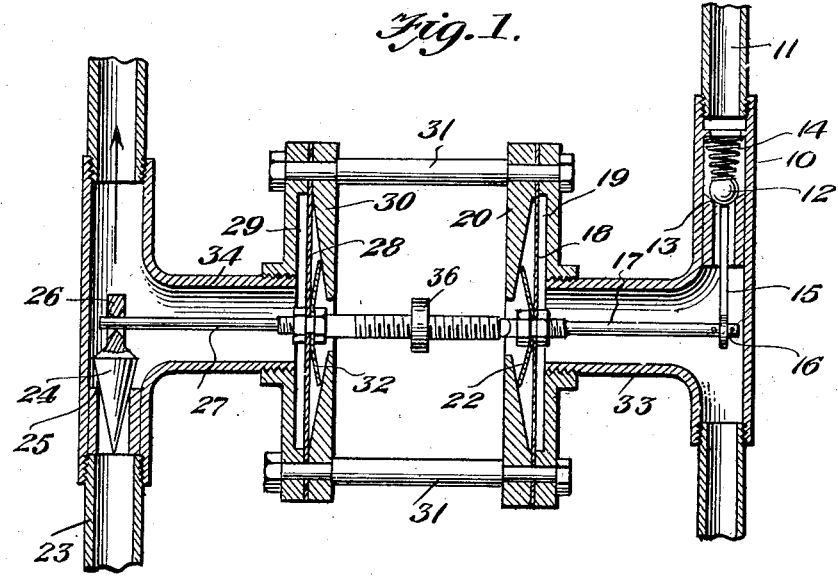
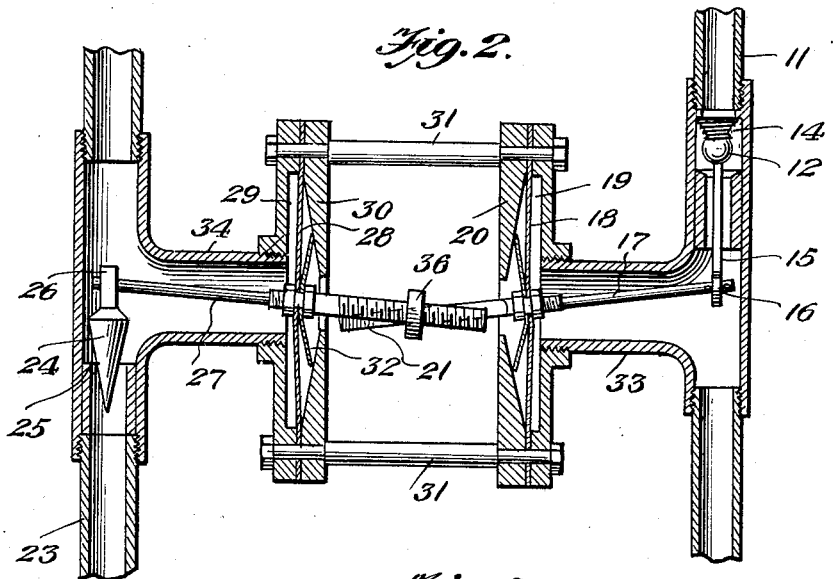
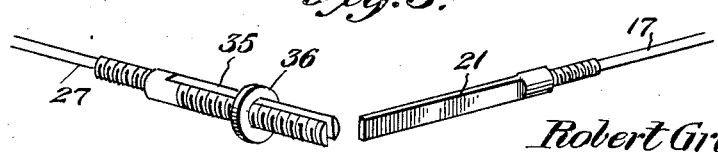
Robert Grant
INVENTOR
BY Victor J. Evans
ATTORNEY Patented Feb. 25, 1930

1,748,342

UNITED STATES PATENT OFFICE

ROBERT GRANT, OF HOLLYWOOD, CALIFORNIA, ASSIGNOR TO THE GRANTALVE REGULATOR CO., INCORPORATED, OF LOS ANGELES, CALIFORNIA, A CORPORATION OF CALIFORNIA

VALVE-ACTUATING MECHANISM

Application filed August 1, 1928. Serial No. 296,793.

This invention relates to improvements in valve operating mechanisms, an object being to provide means for actuating a valve which will be automatically controlled, and may be applied to water heaters for regulating a hot water supply, and for other purposes, the invention being especially designed for use with the type of heater known as "instantaneous".

Another object of the invention is the provision of means for operating a fuel supply valve through pressure operated means such as water pressure, and for connecting the supply and pressure valves in a manner to prevent leakage of both fuel and water, together with means for adjusting the connecting means so that the operation of the fuel supply valve may be regulated in accordance with the operation of the pressure valve.

Another object of the invention is the provision of a valve operating means of the above character which is simple in construction, reliable in use, and may be cheaply and easily installed.

With the above and other objects in view, the invention further includes the following novel features and details of construction, to be hereinafter more fully described, illustrated in the accompanying drawing and pointed out in the appended claims.

In the drawing:—

Figure 1 is a sectional view of the invention with the valves in closed position.

Figure 2 is a similar view showing the valve open.

Figure 3 is a fragmentary perspective view illustrating the connection between the adjacent ends of the diaphragm carried rods.

Referring to the drawing in detail wherein like characters of reference denote corresponding parts, the reference character 10 indicates generally a valve which may be arranged within a gas pipe 11 to control a supply of fuel to a burner (not shown) for use in heating water. The valve is indicated at 12 and is adapted to engage a seat 13 provided within the supply pipe 11 and is yieldingly held upon the seat by means of a spring 14. A stem 15 extends from the valve and has its end loosely connected as shown at 16 to one end of a rod 17.

This rod 17 is secured to a diaphragm 18, the latter providing a fulcrum for the rod. The diaphragm is mounted within a diaphragm chamber 19 provided in a housing 20 and the outer end of the rod is longitudinally reduced so as to provide a relatively narrow portion 21 whose opposite faces are flat. A spring 22 arranged within the diaphragm chamber assists in yieldingly holding the diaphragm against flexing.

The invention is especially designed for controlling the fuel supply to "instantaneous" water heaters and for this purpose a pressure operated valve which is arranged in a water supply pipe 23 is utilized. This valve may be of any suitable type but is shown as consisting of a conical valve member 24 which is adapted to engage a seat 25 provided in the water supply pipe 23. The stem of this valve has a loose pivotal connection 26 with one end of a rod 27 and the latter is secured to a diaphragm 28. This last mentioned diaphragm is mounted in a diaphragm chamber 29 provided in a housing 30 and this housing and the housing 20 are connected by spaced rods or bolts 31. A spring 32 acts to assist in yieldingly holding the diaphragm 28 in normal position.

The diaphragm chamber 19 and the fuel supply pipe 11 are connected by a short pipe section 33, and the water supply pipe 23 and the diaphragm chamber 29 are connected by a short pipe section 34.

The outer end of the rod 27 extends beyond the diaphragm 28 and is bifurcated as shown at 35 to receive the end 21 of the rod 17. This bifurcated end of the rod 27 is exteriorly threaded and is engaged by a nut 36 which provides a fulcrum between the rods 17 and 27.

Water pressure within the pipe 23 will unseat the valve 24 so that its rod 27 will be rocked upon the fulcrum provided by the diaphragm 28, the latter being flexed by the spring 32. This movement of the rod 27 will impart a reverse rocking or pivotal movement to the rod 17 so as to unseat the valve 12 against the action of the spring 14. This position of the parts is shown in Figure 2 of the drawings. As soon as pressure against the valve 24 is relieved, the said valve will be seated and the parts will resume their normal position so as to reseat the valve 12 and cut off the supply of fuel.

By adjusting the nut 36 upon the threaded end of the rod 27, the fulcrum point between the rods 17 and 27 may be regulated. Greater or less movement of the valve 12 may thus be obtained so that the degree of opening of this valve may be regulated to regulate the supply of fuel. This also permits regulation of the valve 12 in accordance with pressure in the water system so that the valve operating means may be accurately adjusted in accordance with such pressure.

In addition, by mounting the rods 17 and 27 upon the diaphragms, use of stuffing boxes is eliminated and leakage both in the fuel supply and water supply is absolutely prevented.

The invention is susceptible of various changes in its form, proportions and minor details of construction and the right is herein reserved to make such changes as properly fall within the scope of the appended claims.

Having described the invention what is claimed is:

1. In combination, a fuel supply valve, a pressure operated valve, spaced diaphragms mounted between the valves, rods secured to and supported for pivotal movement by the diaphragms and having their remote ends connected with the valves, and an adjustable pivotal connection for the adjacent ends of the rods to actuate the fuel supply valve when the pressure operated valve is actuated.

2. In combination, a fuel supply valve, a pressure operated valve, spaced diaphragms mounted between the valves, rods secured to and supported for pivotal movement by the diaphragms and having their remote ends connected with the valves, a threaded bifurcated end provided at one end of one of the rods to movably receive the adjacent end of the other rod, a nut surrounding the adjacent ends of the rods and threadedly engaging the bifurcated rod to provide an adjustable pivotal connection between the rods.

3. In combination, a fuel supply valve, a pressure operated valve, spaced diaphragms mounted between the valves, rods secured to and supported for pivotal movement by the diaphragms and having their remote ends connected with the valves, means pivotally connecting the adjacent ends of the rods to actuate the fuel supply valve when the pressure operated valve is actuated, and means included in said connecting means to regulate the position of the pivotal connection and control the degree of movement of one rod with respect to the other rod.

In testimony whereof I affix my signature.

ROBERT GRANT.